(12) United States Patent
Han et al.

(10) Patent No.: US 6,841,137 B2
(45) Date of Patent: Jan. 11, 2005

(54) APPARATUS FOR GENERATING OZONE IN HIGH CONCENTRATION

(75) Inventors: Seung Hee Han, Seoul (KR); Yeon Hee Lee, Seoul (KR); Gyu Jin Ha, Seoul (KR); In Bae Jung, Seoul (KR); Jang Seop Kim, Seoul (KR)

(73) Assignees: Korea Institute of Science and Technology, Seoul (KR); Youl Chon Chemical Co., Ltd., Seoul (KR)

( * ) Notice: Subject to any disclaimer, the term of this patent is extended or adjusted under 35 U.S.C. 154(b) by 0 days.

(21) Appl. No.: 10/038,649

(22) Filed: Jan. 8, 2002

(65) Prior Publication Data

US 2003/0007908 A1 Jan. 9, 2003

(30) Foreign Application Priority Data

Jul. 4, 2001 (KR) .......................................... 2001-39821

(51) Int. Cl.[7] ................................................ B01J 19/08
(52) U.S. Cl. ............................... 422/186.16; 422/186.11
(58) Field of Search ........................ 422/186.16, 186.11, 422/186.07, 186.15, 186.2

(56) References Cited

U.S. PATENT DOCUMENTS 5,130,003 A * 7/1992 Conrad ................... 422/186.16
5,417,936 A * 5/1995 Suzuki et al. ........... 422/186.07
5,443,800 A * 8/1995 Dunder ................... 422/186.16

* cited by examiner

Primary Examiner—Kishor Mayekar
(74) Attorney, Agent, or Firm—Oblon, Spivak, McClelland, Maier & Neustadt, P.C.

(57) ABSTRACT

An apparatus for generating ozone in high concentration with efficiency and linearly controlling the concentration of ozone is disclosed. The apparatus includes an oxygen generator, a flat plate type ozone generator, a high-voltage transformer, a high-frequency inverter, a cooling-water supplier, and a control signal generator. The high-frequency inverter linearly controls the concentration of ozone by applying a high-frequency voltage pulse generated according to a predetermined ON/OFF time ratio corresponding to a voltage level of a control signal, to the flat plate type ozone generator through the high-voltage transformer. The flat plate type ozone generator uses a flat plate type ceramic as dielectrics, thereby optimizing the efficiency of ozone generation and the endurance of the ozone generator, and thus simultaneously miniaturizing dimension thereof.

6 Claims, 4 Drawing Sheets

APPARATUS FOR GENERATING OZONE IN HIGH CONCENTRATION

BACKGROUND OF THE INVENTION

1. Field of the Invention

The present invention relates to an apparatus for generating ozone; and, more particularly, to an apparatus for generating ozone in high concentration with high efficiency and controlling the density of the ozone being generated.

2. Description of the Related Art

Ozone ($O_3$) has been used for various applications because of its strong oxidization, decolorization, deodorization, and sterilization properties. It is, however, impossible to store ozone under room temperature and atmospheric pressure since it tends to reduce to oxygen ($O_2$). Thus, in order to use ozone, one has to use an ozone generating apparatus, which uses oxygen or air as a raw material for ozone.

Several methods have been developed for ozone generation, such as a method using ultraviolet rays, a silent discharge method and a method of electrolyzing water, etc. Among these methods, a silent discharge method using high-voltage has been used for a wide variety of industrial applications because it can efficiently produce highly concentrated ozone (See, Siemens W. 1857, Ann. Phy. Chem. 102, 66–122).

As is well known in the art, the silent discharge method uses two metal electrodes with one or both of them insulated with a dielectric material. An AC (alternating current) signal is applied to the electrodes and a discharge is then performed in a space between the metal electrodes while oxygen-containing air passes through the space, thereby transforming some of the oxygen into ozone.

An ozone generator using the silent discharge method can be implemented using various shapes and structures. The most popular structure is a cylindrical structure that employs one or more glass pipes. In this method, each of the glass pipes is installed inside metal cylinders being used as ground electrodes, and the glass pipes are coated on the inside with a metal film to provide a high-voltage electrode. This type of cylindrical ozone generator, however, is too voluminous for practical use, and it does not provide a uniform discharge because of the difficulty of maintaining constant intervals between the glass pipes and metal cylinders. Moreover, the glass pipe used as a dielectric become corroded by ozone generated therein, which causes the dielectric breakdown. To overcome such limitations in the conventional cylindrical ozone generators and to raise concentration of ozone being generated, U.S. Pat. No. 5,759,497 discloses a flat plate type ozone generator using flat plate type ceramic as a dielectric, sometimes referred to as an "Otto-Plate type ozone generator."

To perform a silent discharge by using various types of ozone generators as discussed above, a high-voltage sine wave signal with a commonly used frequency, e.g., 60 Hz (Hertz), is adopted. It is, however, difficult to raise ozone concentration by using an AC signal at such a frequency. Therefore, an ozone generator using an inverter to generate a mid-range frequency signal of about 1 kHz (kilo-Hertz) has recently been developed.

Nevertheless, it is still difficult to effectively raise the ozone concentration because the high-voltage signal is a sine wave.

There are several methods for controlling the ozone concentration in ozone generating apparatuses, such as changing the voltage level or changing the frequency of the high-voltage signal used in ozone generation, and changing the pulse width. However, owing to the characteristics of the silent discharge, it is considerably difficult to linearly control the ozone concentration by these methods. Specifically, when changing the voltage level of a high-voltage signal applied to an ozone generating apparatus, the ozone concentration is normally increased as the voltage level is increased. However, the relationship between the concentration of ozone generated by the ozone generating apparatus and the voltage level applied to the apparatus is not linear, and the silent discharge can be performed only when the voltage level is equal or above a predetermined level. Therefore, it is very difficult to linearly control the ozone concentration by changing the voltage level of the high-voltage signal.

In instances where the frequency of the high-voltage pulse is changed to control the ozone concentration, optimal efficiency in ozone generation cannot be obtained because of impedances between the ozone generator, the high-frequency inverter, and the high-voltage transformer cannot be matched due to the frequency change. Additionally, in instances where the pulse width of the high-voltage pulse is changed, the ozone concentration stops increasing when the pulse width increases over an optimal pulse width.

SUMMARY OF THE INVENTION

It is, therefore, an objective of the present invention to provide an apparatus for generating ozone in high concentration and linearly controlling the ozone concentration. This objective is achieved in such a manner that a high-frequency inverter mixes low-frequency pulse having a predetermined ON/OFF time ratio according to a control signal and a high-frequency voltage pulse for generating a discharge, thereby transforming an ON/OFF time ratio of a high-frequency voltage pulse, and applies the high-frequency voltage pulse to the ozone generator through a high-voltage transformer.

Instead of an ozone generator that employs the cylindrical glass pipe, the present invention uses a flat plate type ozone generator using a flat plate type ceramic as a dielectric, thereby optimizing the efficiency of ozone generation and the endurance of the ozone generator and simultaneously miniaturizing the dimension of the flat plate type ozone generator.

Since the present invention uses the high-frequency voltage pulse to obtain the high-voltage waveform to be applied to the ozone generator, rather than the sine wave with a commonly used frequency, e.g., 60 Hz (Hertz) or a mid-frequency, it is possible to generate a silent discharge that is suitable for generating ozone in high concentration. This is achieved by allowing the electrodes to emit a great number of electrons with high energy level that are very useful for generating ozone in instances where the high-frequency voltage pulse is used.

The concentration of ozone in the present invention is linearly controlled in accordance with a control signal inputted to a high-voltage inverter in such a manner that the ON/OFF time ratio of the high-frequency voltage pulse is controlled by mixing a high-voltage pulse signal optimized for the silent discharge, and a low-frequency pulse having a predetermined ON/OFF time ratio according to the control signal.

According to the present invention, there is provided an apparatus for generating ozone and linearly controlling the concentration of the ozone being generated, including: an oxygen generator; an ozone generator for generating ozone by applying a discharge to the oxygen provided by the oxygen generator; a high-frequency inverter for providing a high-frequency pulse signal having an adjusted ON/OFF time ratio; and a high-voltage transformer for providing the high-frequency pulse signal transformed into a predetermined signal level.

BRIEF DESCRIPTION OF THE DRAWINGS

The above objective and other features of the present invention will become apparent from the following description of preferred embodiment given in conjunction with the accompanying drawings, in which.

DETAILED DESCRIPTION OF THE PRESENT INVENTION

The detailed description of the present invention will now be made with reference to the accompanying drawings.

Figure 1:
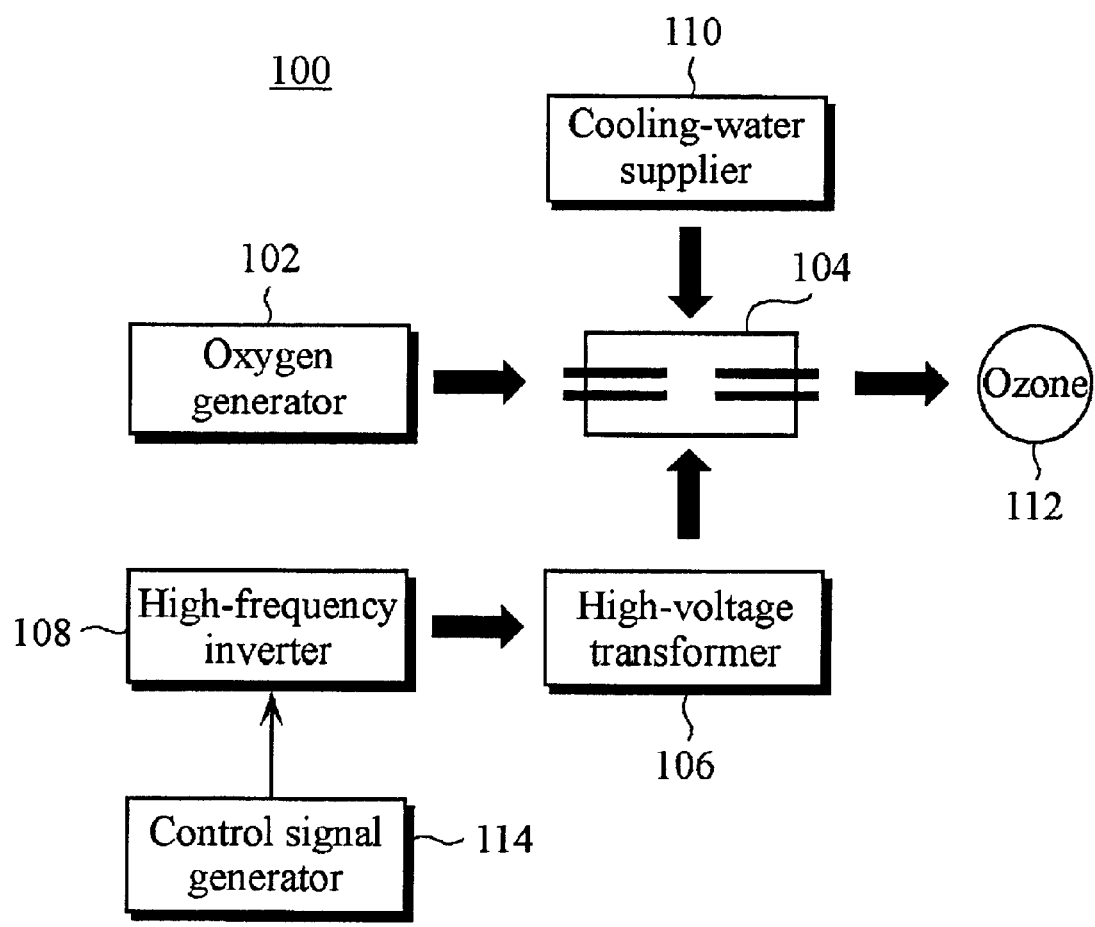
FIG. 1 is a block diagram of an apparatus for generating ozone in high concentration in accordance with the present invention.

FIG. 1 shows a block diagram of an apparatus for generating ozone in high concentration in accordance with the present invention. As shown in FIG. 1, the ozone generating apparatus 100 includes an oxygen generator 102, a flat plate type ozone generator 104, a high-voltage transformer 106, a high-frequency inverter 108, a cooling-water supplier 110, and a control signal generator 114.

In order to generate ozone 112 in high concentration, a high-frequency voltage pulse, which is generated by the high-frequency inverter 108 and the high-voltage transformer 106, is applied to the flat plate ozone generator 104. Oxygen generated by the oxygen generator 102 is used as a raw material for ozone. The cooling-water supplier 110 supplies cooling water to prevent from rising the temperature of the flat plate type ozone generator 104, wherein the temperature rise is caused by a silent discharge. There are two signal oscillation devices within the high-frequency inverter 108, one of which is a signal oscillation device for generating a low-frequency pulse having an ON/OFF time ratio according to a control signal inputted from the control signal generator 114, while the other is for generating a high-frequency pulse to be applied to the flat plate ozone generator 104 in order to generate a silent discharge.

In particular, the high-frequency inverter 108 mixes the low-frequency pulse having the ON/OFF time ratio according to the control signal and the high-frequency pulse, which is applied to the flat plate type ozone generator 104, so that it is generated a high-frequency voltage pulse having an adjusted ON/OFF time ratio same as that of the low-frequency pulse. In other words, the high-frequency inverter 108 of the ozone generating apparatus 100 uses two different frequencies, i.e., dual frequency of the low-frequency and the high-frequency, which are used for controlling the ON/OFF time ratio of the high-frequency voltage pulse, thereby linearly controlling the generation of ozone in high concentration. FIG. 3B shows the high-frequency voltage pulse having the adjusted ON/OFF time ratio. More detailed description about that will follow later.

The control signal generator 114 generates the control signal to be inputted to the high-frequency inverter 108 in order to adjust the ON-OFF time ratio of the high-frequency voltage pulse. FIG. 1 illustrates the ozone generating apparatus 100 including only one ozone generator 104, but is not limited thereto. It is noted that a plurality of ozone generators may be coupled in series or in parallel to obtain a higher density of ozone are available.

Figure 2:
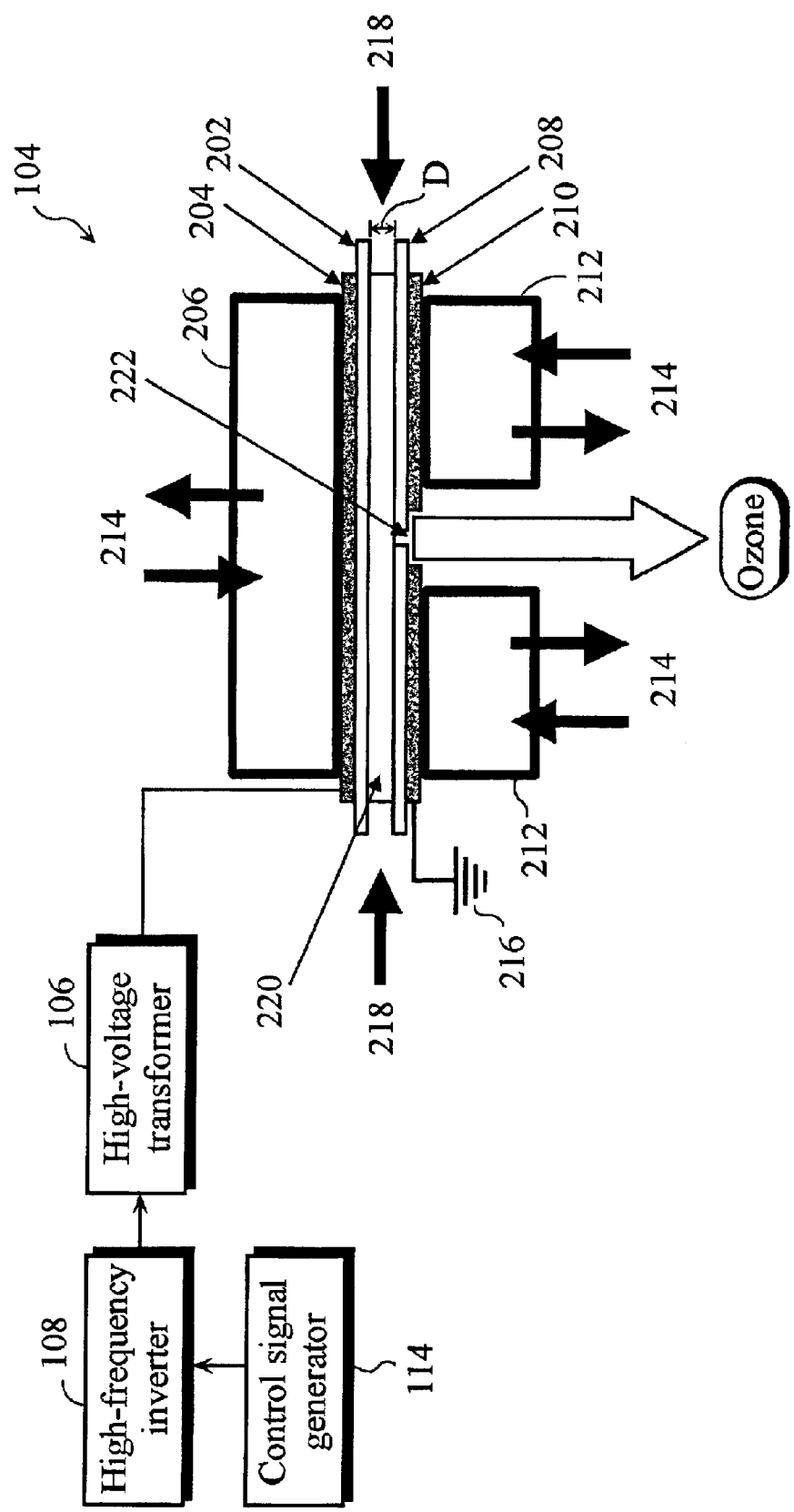
FIG. 2 illustrates a flat plate type ozone generator used in the ozone generating apparatus in accordance with the present invention.

FIG. 2 illustrates a flat plate type ozone generator 104 used in the ozone generating apparatus 100, which has a flat plate structure in which an upper electrode 204 and an lower electrode 210 are opposed to each other. At least one of those electrodes 204 and 210 must be insulated. They are made of high-purity alumina. Corresponding to the electrodes, there are formed an upper insulator 202 and a lower insulator 208 with a metal conduction film coated on one side of each insulator. Although, the present invention employs the high-purity alumina as a material of which the upper and lower insulators 202 and 208 are made, other insulating material capable of providing a desired insulation result can be used.

To prevent temperature rise in the upper insulator 22 at the time of the silent discharge, a cooling water jacket 206 made of metal is provided on the upper electrode 204. With the same purpose, a cooling water jacket 212 is provided on the lower electrode 212. The metal for those cooling water jackets 206 and 212 is aluminum having high workability and high heat transfer efficiency. However, other material having the same property may be available. Cooling water 214 circulating within the cooling water jackets 206 and 212 is supplied from the cooling water supplier 110 of FIG. 1.

In order to form a discharge space 220 where the silent discharge is introduced by plasma discharge, there is provided a minute and uniform gap D between the upper and lower insulators 202 and 208. Oxygen 218 generated by the oxygen generator 218 shown in FIG. 1 from both sides of the discharge space 220 passes through the discharge space 220 and it is transformed to ozone by means of the silent discharge. The ozone is released to outside of the flat plate type ozone generator 104 through an ozone release hole 222 provided through centers of the lower insulator 208, the lower electrode 210 and the cooling water jacket 212. Herein, the gap D of the discharge space 220 is, e.g., 0.6 mm~2 mm, that could provide the most efficient ozone generation.

For the frequency of the high-voltage pulse suitable for the silent discharge, there is used the optimum high-frequency known as to provide the most efficient transmission of the power to the ozone generator 104 through the high-frequency inverter 108 and the high-voltage transformer 106. As described above, the high-frequency inverter 108 receives the control signal of a DC signal from the control signal generator 114. After that, it generates the low-frequency pulse having the ON/OFF time ratio depending on a voltage level corresponding to the control signal. Furthermore, the high-frequency inverter 108 generates the high-frequency pulse optimized to generate ozone. Then, the high-frequency inverter 108 mixes the low-frequency pulse and the optimized high-frequency pulse, thereby generating the high-frequency pulse having the adjusted ON/OFF time ratio, and applying it to the high-voltage transformer 106. Thereafter, the high-frequency transformer 106 converts the applied high-frequency pulse into the high-frequency voltage pulse and applies it to the ozone generator 104, wherein the high-frequency voltage pulse has its ON/OFF time ratio having been already adjusted in the previous step. The detailed description about this will follow with reference to FIGS. 3A and 4.

In order to generate the silent discharge in the present invention, there is used the high-frequency voltage pulse having a frequency of, e.g., 1 to 50 kHz and a voltage level of 3 to 15 kV with a pulse width of 1 to 10 $\mu$s. The high-voltage transformer 106 is necessary to generate such the high-frequency voltage pulse. The efficiency of ozone generation is optimized through minimizing the pulse elevation time of the high-frequency voltage pulse.

In order to minimize the pulse rising time of the pulse applied to the upper electrode 204, the present invention uses a material having a high performance (i.e., high saturation magnetic flux and low loss) amorphous alloy, e.g., Metglass that is commercially available. for a core (not shown) of the high-voltage transformer 106, and also uses a transformer bobbin made of Teflon for the insulation against high-voltage. Such material, however, does not limit the embodiment of the present invention.

The high-voltage transformer 106 generates the high-frequency voltage pulse having the adjusted ON/OFF time ratio, and it applies the same to the upper electrode 204 of the ozone generator 104, thereby generating the silent discharge in the discharge space 220. Accordingly, the oxygen 218 passing through the discharge space 220 is transformed into ozone by means of the silent discharge. The lower electrode 210 is electrically connected to a ground 216 for the safety during the operation of the flat plate type ozone generator 104.

Figure 3A:
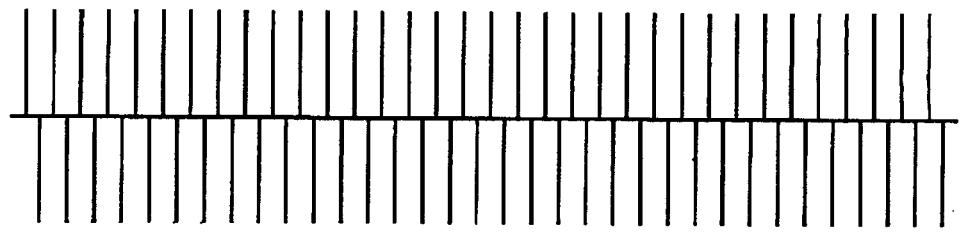
FIGS. 3A and 3B depict a high-frequency voltage pulse having an adjusted ON/OFF time ratio in order to linearly control the ozone concentration in the ozone generating apparatus in accordance with the present invention.
Figure 3B:
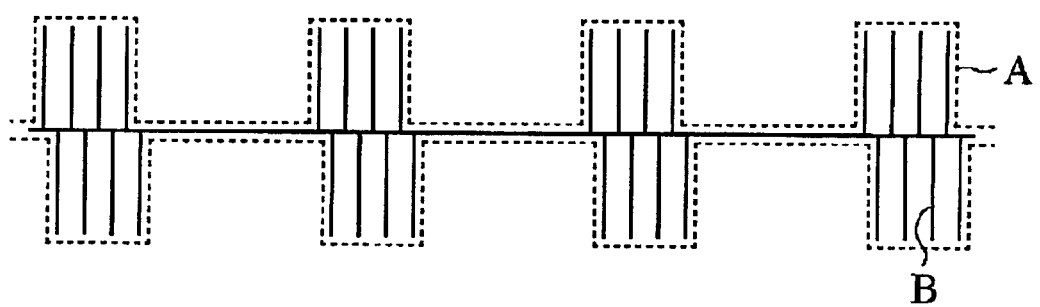

FIGS. 3A and 3B depict the high-frequency voltage pulse having the adjusted ON/OFF time ratio to be used to linearly control the ozone concentration. FIG. 3A illustrates the high-frequency voltage pulse for obtaining the maximum concentration of ozone by the ozone generating apparatus 100 shown in FIG. 1. According to FIG. 3A, an ON state of the high-frequency voltage pulse is 100%, whereas OFF state thereof is 0%, thereby always applying the high-frequency voltage pulse to the upper electrode 204, and consequently the maximum concentration of ozone, i.e., the maximum ozone production rate, can be obtained. FIG. 3B illustrates the high-frequency voltage pulse, in case that approximately 40% of the maximum concentration of ozone is generated. As illustrated in FIG. 3B, when the high-frequency inverter 108 sets ON and OFF states of a low-frequency pulse A generated according to the control signal to 40% and 60%, respectively, a high-frequency voltage pulse B adjusted like this is applied to the upper electrode 104 through the high-voltage transformer 106, resulting that the silent discharge occurs only for 40% of the entire discharge time, which enables to control the concentration of ozone within 40% of the maximum concentration of ozone.

The control signal controlling the concentration of ozone and outputted from the control signal generator 114 to the high-frequency inverter 108, is a DC (direct current) voltage signal of a low voltage having its absolute value ranging from 0 to 10 V. The low-frequency pulse having an ON/OFF time ratio according to the control signal has a frequency lower than that of the high-frequency voltage pulse applied to the upper electrode 204 for generating the silent discharge. For example, it ranges from several Hz to several kHz. For instance, if a DC signal ranging between 0 V and 5 V is used as the control signal, the adjusted signal has an ON/OFF time ratio as follows: in the ON state 0% of the time and in the OFF state 100% of the time when the control signal is 0 V; in the ON state 20% of the time and in the OFF state 80% of the time when the control signal is 1 V; in the ON state 60% of the time and in the OFF state 40% of the time when the control signal is 3 V; in the ON state 80% of the time and in the OFF state 20% of the time when the control signal is 4 V; and, in the ON state 100% of the time and in the OFF state 0% of the time when the control signal is 5 V. Since the ON/OFF time ratio is represented as above, the high-frequency inverter 108 generates the low-frequency pulse signals A corresponding to the voltage level of the control signals. Next, the high-frequency pulse signal optimized for generation of ozone is mixed with the low-frequency pulse signal, and then a high-frequency voltage pulse B adjusted to the ON/OFF time ratio of the low-frequency pulse signal is applied to the ozone generator 104.

Figure 4:
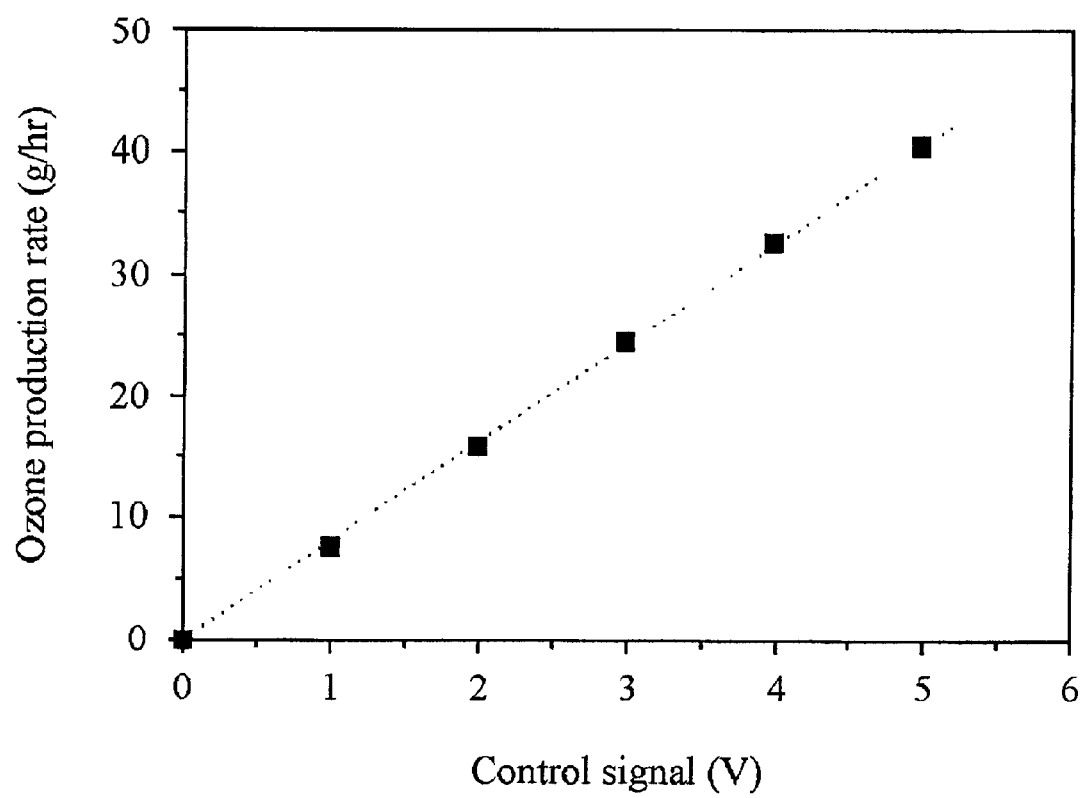
FIG. 4 is a graph showing the ozone concentration in terms of the ozone production rate versus a control signal in accordance with the present invention.

FIG. 4 is a graph showing the ozone concentration in terms of the ozone production rate versus the control signal in accordance with the present invention. As illustrated in FIG. 4, since the high-frequency voltage pulse having the ON/OFF time ratio adjusted depending on the control signal from the control signal generator 114 through the high-frequency inverter 108 and the high-voltage transformer 106 is applied to the flat plate type ozone generator 104, the ozone production rate is changed and, therefore, the concentration of ozone is linearly controlled.

While the invention has been described with reference to its preferred embodiment, it will be apparent to those skilled in the art that variations and modifications are possible without deviating from the broad principles and teachings of the present invention which should not be limited solely by the scope of the claims appended hereto.

What is claimed is:

1. An apparatus for generating ozone and linearly controlling the concentration of the ozone being generated, comprising:

means for providing oxygen;

means for generating ozone by applying electrical discharge to the oxygen provided by the means for providing oxygen;

means for generating a control signal;

means for providing a first pulse signal, for the electrical discharge, wherein the first pulse signal providing means is configured to generate a low-frequency pulse having an ON/OFF time ratio depending on the control signal and a high-frequency pulse optimized for the electrical discharge, to mix the low-frequency pulse and the high-frequency pulse, and to generate the first pulse signal having an adjusted ON/OFF time ratio; and means for transforming the first pulse signal from the first pulse signal providing means into a predetermined signal level having a frequency in a range of 1 to 50 kHz, wherein the transformation means is electrically connected to the ozone generation means and the first pulse providing means.

2. The apparatus of claim 1, wherein each of the first pulse and the high-frequency pulse has an identical frequency and a different ON/OFF time ratio.

3. The apparatus of claim 1, wherein the ozone generation means includes:

at least one upper electrode and one lower electrode opposed to each other, for generating voltage discharge;

flat-shaped insulating material provided on one of each side of the upper electrode and the lower electrode; and a cooling means provided adjacent to one of each side of the upper electrode and the lower electrode, wherein the upper electrode is electrically connected to the transformation means, the first pulse signal is applied to the upper electrode, and the lower electrode is grounded.

4. The apparatus of claim 3, wherein a gap ranging from 0.6 mm to 2 mm is provided between the upper and lower electrodes, in order to form a discharge space.

5. The apparatus of claim 4, wherein the ozone is generated in the discharge space.

6. The apparatus of claim 1, wherein the first pulse providing means includes a first oscillating means for generating the low-frequency pulse and a second oscillating means for generating the high-frequency pulse.

* * * * *